(12) United States Patent
Vankamamidi et al.

(10) Patent No.: US 10,908,997 B1
(45) Date of Patent: Feb. 2, 2021

(54) SIMPLE AND EFFICIENT TECHNIQUE TO SUPPORT DISK EXTENTS OF DIFFERENT SIZES FOR MAPPED RAID

(71) Applicant: EMC IP Holding Company LLC, Hopkinton, MA (US)

(72) Inventors: Vamsi K. Vankamamidi, Hopkinton, MA (US); Shuyu Lee, Acton, MA (US); Ronald D. Proulx, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/526,547

(22) Filed: Jul. 30, 2019

(51) Int. Cl.
  *G06F 12/00* (2006.01)
  *G06F 11/10* (2006.01)
  *G06F 3/06* (2006.01)
  *G06F 12/02* (2006.01)

(52) U.S. Cl.
  CPC ........ *G06F 11/1084* (2013.01); *G06F 3/0619* (2013.01); *G06F 3/0653* (2013.01); *G06F 3/0689* (2013.01); *G06F 12/0253* (2013.01)

(58) Field of Classification Search
  CPC .. G06F 11/1084; G06F 3/0619; G06F 3/0653; G06F 3/0689; G06F 12/0253
  See application file for complete search history.

(56) References Cited

U.S. PATENT DOCUMENTS

| | | | | |
|---|---|---|---|---|
| 8,156,290 | B1 * | 4/2012 | Vanninen | G06F 3/061 711/154 |
| 8,443,153 | B1 * | 5/2013 | Edwards | G06F 11/1076 711/147 |
| 10,146,456 | B1 | 12/2018 | Gao et al. | |
| 10,152,254 | B1 | 12/2018 | Kang et al. | |
| 10,235,082 | B1 | 3/2019 | Gao et al. | |
| 10,402,262 | B1 | 9/2019 | Wu et al. | |
| 10,481,802 | B1 | 11/2019 | Gao et al. | |
| 10,534,539 | B1 | 1/2020 | Gao et al. | |
| 10,540,103 | B1 | 1/2020 | Gao et al. | |
| 10,592,138 | B1 | 3/2020 | Han et al. | |
| 10,592,165 | B1 | 3/2020 | Han et al. | |
| 10,747,617 | B2 | 8/2020 | Gao et al. | |
| 10,782,894 | B1 | 9/2020 | Han et al. | |
| 2003/0023811 | A1 * | 1/2003 | Kim | G06F 3/0601 711/114 |
| 2007/0168633 | A1 * | 7/2007 | English | H04L 67/1097 711/165 |
| 2007/0294565 | A1 * | 12/2007 | Johnston | G06F 11/1076 714/6.12 |
| 2010/0115198 | A1 * | 5/2010 | Jess | G06F 3/0611 711/114 |
| 2016/0077746 | A1 * | 3/2016 | Muth | G06F 3/0608 711/159 |

\* cited by examiner

*Primary Examiner* — Prasith Thammavong
(74) *Attorney, Agent, or Firm* — BainwoodHuang (57) ABSTRACT

A technique is directed to storing data on a plurality of storage devices of a data storage array. The technique involves, on each storage device of the plurality of storage devices, providing large disk extents and small disk extents for allocation to RAID extents. The technique further involves forming, from the large disk extents, a user-data RAID extent to store user data for the data storage array. The technique further involves forming, from the small disk extents, an internal-metadata RAID extent to store internal metadata for the data storage array. In some arrangements, spare space is reserved on one or more storage devices between large and small disk extents.

20 Claims, 9 Drawing Sheets

SIMPLE AND EFFICIENT TECHNIQUE TO SUPPORT DISK EXTENTS OF DIFFERENT SIZES FOR MAPPED RAID

BACKGROUND

A conventional data storage system includes storage drives for storing data. The storage drives may be configured to implement a particular Redundant Array of Independent Disks (RAID) level (e.g., RAID Level 5, RAID Level 6, etc.) using a mapped-RAID architecture.

During operation, circuitry of the conventional data storage system divides the space on the storage drives into disk extents of the same size for ease of selection when creating RAID extents from the disk extents. The circuitry then combines disk extents from different storage devices into RAID extents which store data in accordance with the particular RAID level. Some RAID extents store host data provided by one or more host computers. Other RAID extents store system data such as data describing locations of the host data (e.g., mappings) on the storage drives.

SUMMARY

Unfortunately, there are deficiencies to the above described conventional data storage system which divides the space on storage drives into disk extents of the same size. For example, the disk extents are made relatively large so that the number of disk extents that need to be tracked is small. However, this creates a problem in that the RAID extents that hold system data are now too big. Accordingly, all of the system data tends to get concentrated in just a few RAID extents. As a result, input/output operations (I/Os) for system data are focused on only the few storage drives that contribute disk extents to the RAID extents holding system data even though fast access to such system data is extremely important.

In contrast to the above described conventional data storage system which divides the space on storage drives into disk extents of the same size, improved techniques are directed to providing large disk extents and small disk extents on storage devices for allocation to RAID extents of a data storage array. Along these lines, the large disk extents form user-data RAID extents to store user data for the data storage array. Additionally, the small disk extents form internal-metadata RAID extents to store internal metadata for the data storage array. Accordingly, the user-data RAID extents are larger thus enabling the number of disk extents that need to be tracked to remain small. Furthermore, the internal-metadata RAID extents are smaller thus enabling the internal-metadata RAID extents to span more quickly among the storage devices thus improving I/O parallelization (i.e., simultaneous I/Os for faster access).

One embodiment is directed to a method of storing data on a plurality of storage devices of a data storage array. The method includes, on each storage device of the plurality of storage devices, providing large disk extents and small disk extents for allocation to RAID extents. The method further includes forming, from the large disk extents, a user-data RAID extent to store user data for the data storage array. The method further includes forming, from the small disk extents, an internal-metadata RAID extent to store internal metadata for the data storage array.

In some arrangements, each storage device of the plurality of storage devices has a first end and a second end that define a logical block address (LBA) range. A lowest LBA of the LBA range starts at one of the first end and the second end of that storage device. Additionally, a highest LBA of the LBA range starts at the other of the first end and the second end of that storage device. Furthermore, providing the large disk extents and the small disk extents for allocation to the RAID extents includes, on each storage device of the plurality of storage devices, creating a series of large disk extents starting at the first end of that storage device and creating a series of small disk extents starting at the second end of that storage device.

In some arrangements, creating the series of large disk extents on each storage device of the plurality of storage devices includes slicing storage space starting at the first end of that storage device into a contiguous sequence of large disk extents, each large disk extent having a same large disk extent size (e.g., 2 GB, 4 GB, 8 GB, 10 GB, etc.). Additionally, creating the series of small disk extents on each storage device of the plurality of storage devices includes slicing storage space starting at the second end of that storage device into a contiguous sequence of small disk extents. Each small disk extent has a same small disk extent size (e.g., 10 MB, 32 MB, 64 MB, 128 MB, etc.) which is smaller than the large disk extent size.

In some arrangements, the method further includes reserving, on at least some storage devices of the plurality of storage devices, spare space between the contiguous sequence of large disk extents and the contiguous sequence of small disk extents created on those storage devices while the user-data RAID extent stores user data for the data storage array and the internal-metadata RAID extent stores internal metadata for the data storage array.

Additionally, in some arrangements, the method further includes allocating, in response to a request to form another user-data RAID extent, a first portion of spare space on a particular storage device to extend a contiguous sequence of large disk extents starting at the first end of the particular storage device.

Furthermore, in some arrangements, the method further includes allocating, in response to a request to form another internal-metadata RAID extent, a second portion of spare space on a particular storage device to extend a contiguous sequence of small disk extents starting at the second end of the particular storage device.

In some arrangements, the first portion of spare space on the particular storage device is allocated from a first end of the spare space closest to the first end of the particular storage device to extend the contiguous sequence of large disk extents. Additionally, the second portion of spare space on the particular storage device is allocated from a second end of the spare space closest to the second end of the particular storage device to extend the contiguous sequence of small disk extents.

In some arrangements, the method further includes performing, in response to a change in an input/output (I/O) profile of the data storage array, a garbage collection operation to reclaim at least one large disk extent of a contiguous sequence of large disk extents on a particular storage device. The at least one large disk extent is returned to a spare space between the contiguous sequence of large disk extents and a contiguous sequence of small disk extents on the particular storage device.

In some arrangements, the at least one large disk extent included a particular large disk extent that consumed storage space on the particular storage device. Additionally, the method further includes repurposing the storage space consumed by the particular large disk extent into at least one small disk extent for use in a new internal-metadata RAID extent.

In some arrangements, the method further includes performing, in response to a ratio change in an input/output (I/O) profile of the data storage array, a garbage collection operation to reclaim at least one small disk extent of a contiguous sequence of small disk extents on a particular storage device. Additionally, the at least one small disk extent is returned to a spare space between a contiguous sequence of large disk extents and the contiguous sequence of small disk extents on the particular storage device.

In some arrangements, the at least one small disk extent included a particular small disk extent that consumed storage space on the particular storage device. Additionally, the method further includes repurposing the storage space consumed by the particular small disk extent into a portion of a large disk extent for use in a new user-data RAID extent.

In some arrangements, the method further includes allocating the spare space from a set of storage devices to form a hot-spare storage device (e.g., a virtual storage device) for use by the data storage array to reconstruct data from a failed storage device. Additionally, in some arrangements, the method further includes reconstructing data from the failed storage device using the hot-spare storage device while the plurality of storage devices store, as the user data, host data on behalf of a set of host computer in accordance with a mapped-RAID architecture.

In some arrangements, forming the user-data RAID extent to store the user data for the data storage array includes combining multiple large disk extents into a first storage object that provides data storage resiliency in accordance with a particular RAID level, each of the multiple large disk extents residing on a different storage device, the data storage array storing user data within the first storage object on behalf of a set of host computers. Additionally, forming the internal-metadata RAID extent to store the internal metadata for the data storage array includes combining multiple small disk extents into a second storage object that provides data storage resiliency in accordance with the particular RAID level. Each of the multiple small disk extents resides on a different storage device. The data storage array storing internal metadata within the second storage object in support of storing user data on behalf of the set of host computers.

Another embodiment is directed to data storage equipment which includes memory, and control circuitry coupled to the memory. The memory stores instructions which, when carried out by the control circuitry, cause the control circuitry to:
 (A) on each storage device of a plurality of storage devices, provide large disk extents and small disk extents for allocation to Redundant Array of Independent Disk (RAID) extents;
 (B) from the large disk extents, form a user-data RAID extent to store user data for the data storage array; and
 (C) from the small disk extents, form an internal-metadata RAID extent to store internal metadata for the data storage array Yet another embodiment is directed to a computer program product having a non-transitory computer readable medium which stores a set of instructions to store data on a plurality of storage devices of a data storage array. The set of instructions, when carried out by computerized circuitry, causes the computerized circuitry to perform a method of:
 (A) on each storage device of the plurality of storage devices, providing large disk extents and small disk extents for allocation to Redundant Array of Independent Disk (RAID) extents;
 (B) from the large disk extents, forming a user-data RAID extent to store user data for the data storage array; and
 (C) from the small disk extents, forming an internal-metadata RAID extent to store internal metadata for the data storage array.

In accordance with certain embodiments, the user-data RAID extents are larger in size than the internal-metadata RAID extents. Accordingly, the number of disk extents that need to be tracked may remain small. However, since the internal-metadata RAID extents are smaller, the internal-metadata RAID extents are able to span more quickly among the storage devices thus improving I/O parallelization for faster internal metadata access.

It should be further understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in storing data on a plurality of storage devices of a data storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing large disk extents and small disk extents on storage devices for allocation to Redundant Array of Independent Disk (RAID) extents of a data storage array. Along these lines, the large disk extents form user-data RAID extents to store user data for the data storage array. Furthermore, the small disk extents form internal-metadata RAID extents to store internal metadata for the data storage array. Accordingly, the user-data RAID extents are larger thus enabling the number of disk extents that need to be tracked to remain small. Also, the internal-metadata RAID extents are smaller thus enabling the internal-metadata RAID extents to span more quickly among the storage devices thus improving I/O parallelization (i.e., simultaneous I/Os for faster access).

Figure 1:
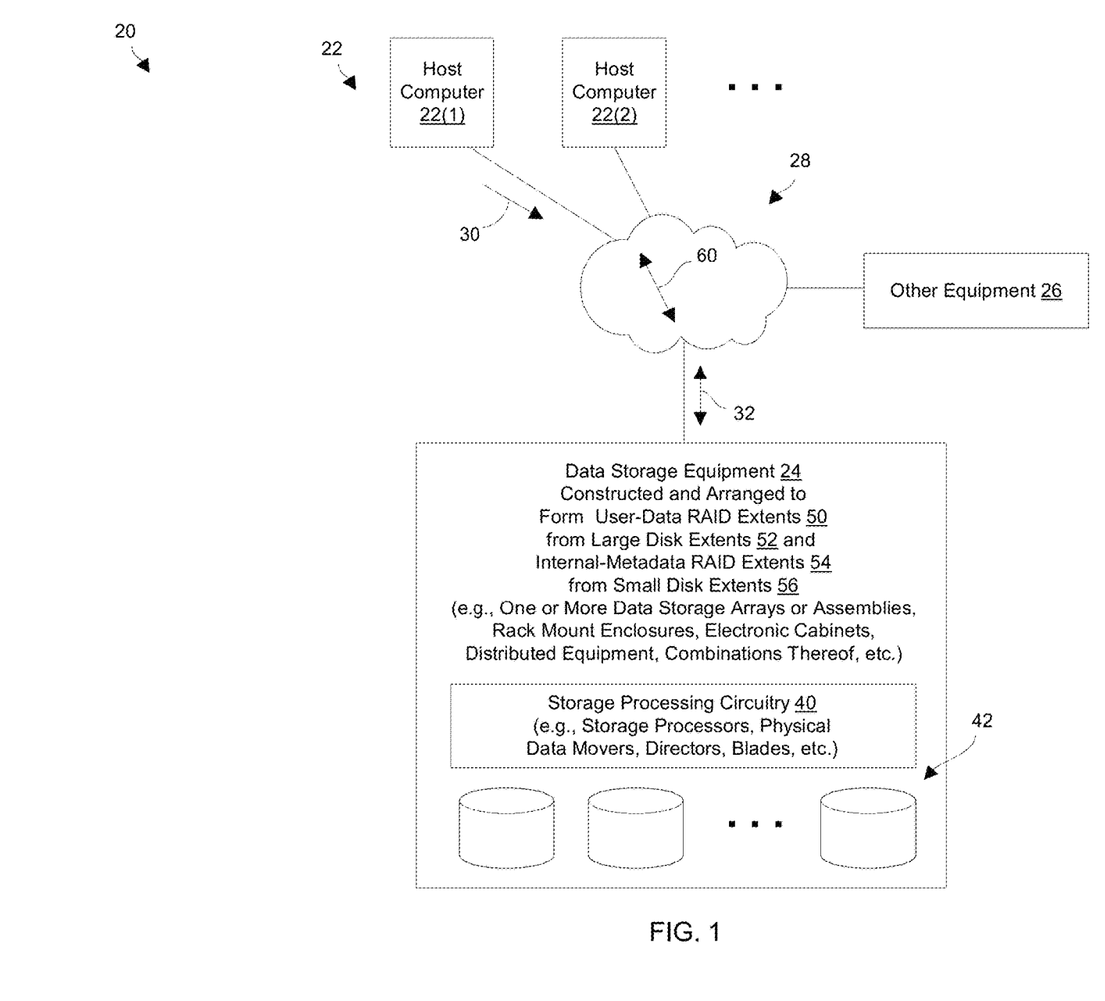
FIG. 1 is a block diagram of a data storage environment which forms user-data RAID extents from large disk extents and internal-metadata RAID extents from small disk extents in accordance with certain embodiments.

FIG. 1 shows a data storage environment 20 that utilizes large disk extents and small disk extents to form user-data RAID extents and internal-metadata RAID extents which are different sizes. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. In this context, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage containers (e.g., a file, a file system, a logical unit of storage or LUN, a volume, a virtual volume or VVol, etc.).

The data storage equipment 24 includes storage processing circuitry 40 and storage devices 42. The storage processing circuitry 40 is constructed and arranged to respond to the host I/O requests 30 from the host computers 22 by writing host data 32 into the storage devices 42 and reading host data 32 from the storage devices 42 (e.g., solid state drives, magnetic disk drives, combinations thereof, etc.). The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 is constructed and arranged to provide a variety of specialized data storage system services such as caching, tiering, deduplication, compression, encryption, mirroring, providing RAID protection, snapshotting, backup/archival services, replication, and so on.

As will be explained in further detail shortly, the storage devices 42 provide user-data RAID extents 50 formed from large disk extents 52, and internal-metadata RAID extents 54 formed from small disk extents 56. The storage processing circuitry 40 stores user data (e.g., the host data 32) in the user-data RAID extents 50. Additionally, the storage processing circuitry 40 stores internal metadata (e.g., location mappings) in the internal-metadata RAID extents 54.

The storage devices 42 may be co-located with the storage processing circuitry 40. Alternatively, the storage devices 42 reside in a separate location (e.g., a separate storage device assembly/enclosure/array).

Additionally, the data storage equipment 24 may take a variety of topologies. In some arrangements, all of the data storage equipment 24 resides in a single location (e.g., a single cabinet, lab, room, floor, building, campus, etc.). In other arrangements, the data storage equipment 24 includes components that are distributed among multiple locations (e.g., different corners of a room, floors, buildings, campuses, towns, states, coasts, countries, etc.).

Furthermore, the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., file-based operations, block-based operations, combinations thereof, etc.

The other equipment 26 refers to other componentry of the data storage environment 20 that may be accessed by the host computers 22 and/or the data storage equipment 24, or other componentry that may be able to access the host computers 22 and/or the data storage equipment 24. For example, the other equipment 26 may include one or more user devices (e.g., a desktop, a laptop, a tablet, a smartphone, a terminal, etc.) which are able to access a host computer 22. As another example, the other equipment 26 may include a storage administrative device (e.g., a service processor) which is able to access the data storage equipment 24, and so on.

The communications medium 28 is constructed and arranged to connect the various components of the data storage environment 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 to the data storage equipment 24 for processing. In response, the storage processing circuitry 40 of the data storage equipment 24 robustly and reliably performs host I/O operations such as writing host data 32 into and reading host data 32 from the storage devices 42 using mapped RAID. In particular, the host data 32 and perhaps other user data (e.g., snapshots, backups, archives, etc.) is stored within the user-data RAID extents 50. Additionally, internal metadata which is used by the data storage equipment 24 to support data storage operations (e.g., extent mappings, snapshot metadata, deduplication metadata, compression metadata, etc.) is stored within the internal-metadata RAID extents 54.

An example size for a large disk extent 52 is 10 GB. However, other large disk extent sizes are suitable for use (e.g., 2 GB, 4 GB, 8 GB, 16 GB, and so on).

Similarly, an example size for a small disk extent 56 is 10 MB. However, other small disk extent sizes are suitable for use (e.g., 32 MB, 64 MB, 128 MB, 256 MB, and so on). Further details will now be provided with reference to FIG. 2.

Figure 2:
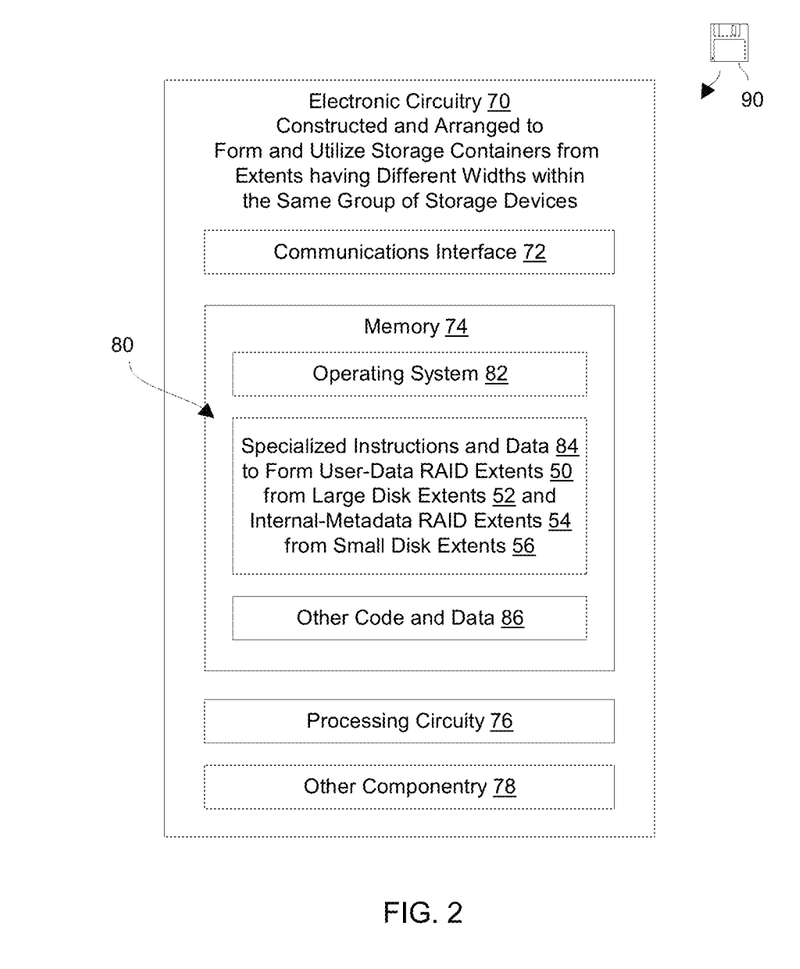
FIG. 2 is a block diagram of electronic circuitry which is suitable for use within the data storage environment of FIG. 1 in accordance with certain embodiments.

FIG. 2 shows an electronic circuitry 70 which is suitable for use within the data storage environment 20 (also see FIG. 1) in accordance with certain embodiments. Along these lines, the electronic circuitry 70 may form a part of the storage processing circuitry 40 or reside as separate circuitry within the data storage equipment 24. The electronic circuitry 70 includes a communications interface 72, memory 74, and processing circuitry 76, and other componentry 78.

The communications interface 72 is constructed and arranged to connect the electronic circuitry 70 to the communications medium 28 (also see FIG. 1) to enable communications with other devices of the data storage environment 20 (e.g., the host computers 22, the other equipment 26, etc.). Such communications may be SAN-based, IP-based, cellular-based, cable-based, fiber-optic based, wireless, cloud-based, combinations thereof, and so on. Accordingly, the communications interface 72 enables the electronic circuitry 70 to robustly and reliably communicate with other external apparatus.

The memory 74 is intended to represent both volatile storage (e.g., DRAM, SRAM, etc.) and non-volatile storage (e.g., flash memory, magnetic memory, etc.). The memory 74 stores a variety of software constructs 80 including an operating system 82, specialized instructions and data 84, and other code and data 86. The operating system 82 refers to particular control code such as a kernel to manage computerized resources (e.g., processor cycles, memory space, etc.), drivers (e.g., an I/O stack), and so on. The specialized instructions and data 84 refers to code that enables electronic circuitry 70 to form and manage the RAID extents 50, 54 from the disk extents 52, 56 having different sizes within each storage device 42. In some arrangements, the specialized instructions and data 84 is tightly integrated with or part of the operating system 82 itself. The other code and data 86 refers to applications and routines to provide additional operations and services (e.g., performance measurement tools, etc.), user-level applications, administrative tools, utilities, and so on.

The processing circuitry 76 is constructed and arranged to operate in accordance with the various software constructs 80 stored in the memory 74. Such circuitry 76 is suitable for forming at least a portion of the storage processing circuitry 40 (also see FIG. 1). In particular and as will be explained in further detail shortly, the processing circuitry 76 executes the specialized instructions and data 84 to form specialized circuitry that creates the RAID extents 50, 54 from the disk extents 52, 56, and utilizes the RAID extents 50, 54 (e.g., stores user data within the user-data RAID extents 50, stores internal metadata within the internal-metadata RAID extents 54, reconstructs data storage devices 42 after a storage device failure, and so on).

Such processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 70. In particular, the computer program product 90 has a non-transitory (or non-volatile) computer readable medium which stores a set of instructions which controls one or more operations of the electronic circuitry 70. Examples of suitable computer readable storage media include tangible articles of manufacture and apparatus which store instructions in a non-volatile manner such as CD-ROM, flash memory, disk memory, tape memory, and the like.

The other componentry 78 refers to other hardware of the electronic circuitry 70. Along these lines, the electronic circuitry 70 may include storage device adaptors, a user interface, other specialized data storage hardware, etc. Further details will now be provided with reference to FIG. 3.

Figure 3:
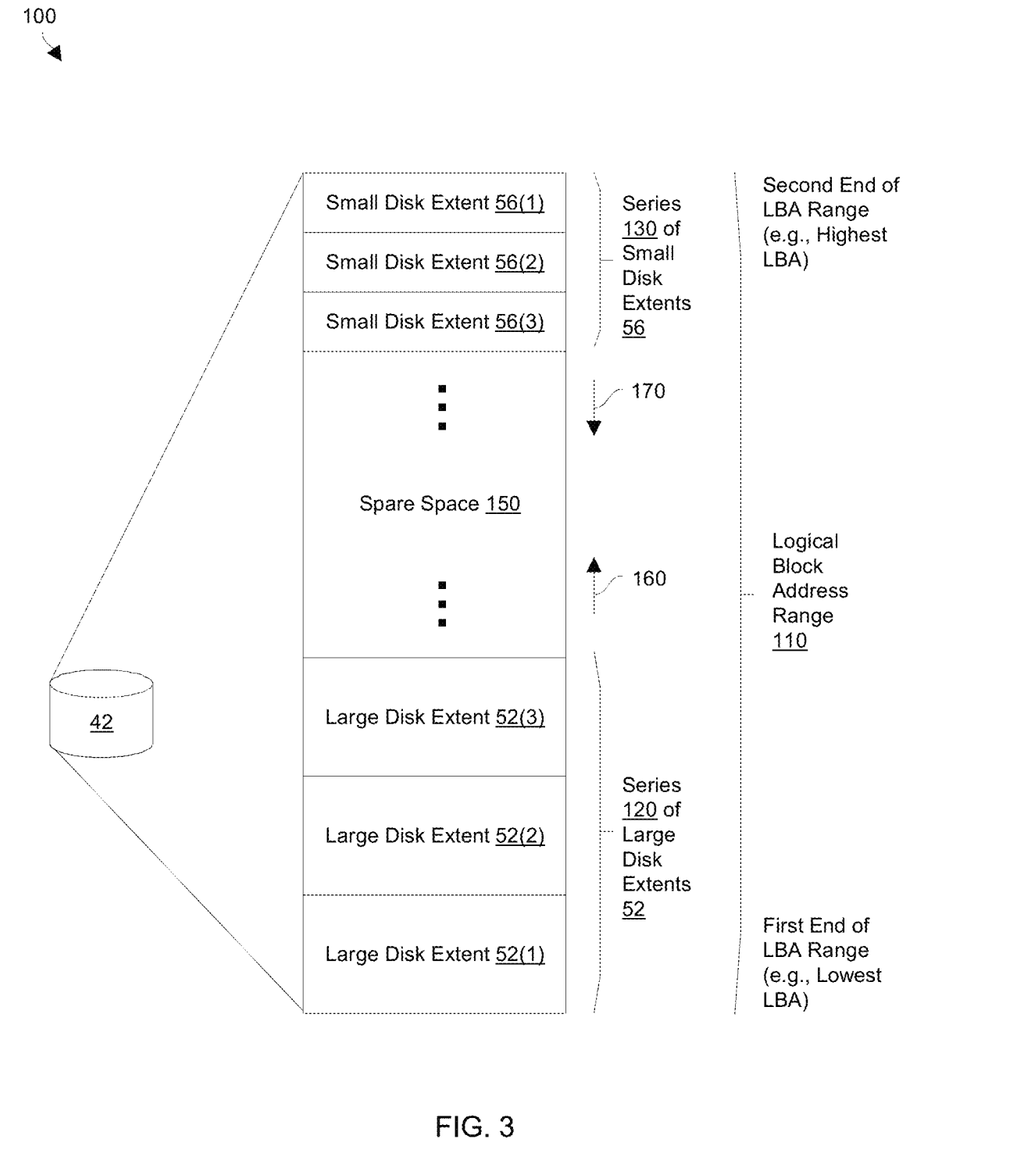
FIG. 3 is a block diagram illustrating an example configuration of large disk extents and small disk extents on a storage device in accordance with certain embodiments.

FIG. 3 shows an example disk extent configuration 100 for a storage device 42 (also see FIG. 1) in accordance with certain embodiments. In support of the example disk extent configuration 100, the storage device 42 is mapped into a range 110 of logical block addresses (LBAs). One end of the LBA range 110 has the lowest LBA and the opposite end of the LBA range 110 has the highest LBA. Such mapping is performed by the storage processing circuitry 40 (e.g., the specialized circuitry formed by the processing circuitry 76 operating in accordance with the specialized instructions and data 84, also see FIG. 2).

As shown in FIG. 3, the example disk extent configuration 100 includes large disk extents 52 and small disk extents 56. In particular, the disk extent configuration 100 includes a series 120 of large disk extents 52(1), 52(2), 52(3), . . . starting at one end of the LBA range 110 (e.g., at the lowest LBA), a series 130 of small disk extents 56(1), 56(2), 56(3), . . . starting at the opposite end of the LBA range 110 (e.g., at the highest LBA).

As further shown in FIG. 3, spare space 150 exists between the series 120 of large disk extents 52 and the series 130 of small disk extents 56. Such spare space 150 may be used for a virtual hot spare storage device 52 within which the storage processing circuitry 40 can reconstruct data that resided on a failed (or failing) storage device 42. In some arrangements, a predefined amount of spare space 150 is reserved for non-disk-extent use (e.g., for data reconstruction purposes).

Additionally, the storage processing circuitry 40 may extend the series 120 of large disk extents 52 by creating new large disk extents 52 from the spare space 150. Accordingly, the series 120 of large disk extents 52 may grow as a contiguous sequence of large disk extents 52 in the direction 160 by consuming some of the spare space 150.

Furthermore, the storage processing circuitry 40 may reduce the series 120 of large disk extents 52 by reclaiming used large disk extents 52 and returning them to the spare space 150 (e.g., via a garbage collection service). Accordingly, the series 120 of large disk extents 52 may shrink in a direction which is opposite the arrow 160.

Likewise, the storage processing circuitry 40 may extend the series 130 of small disk extents 56 by creating new small disk extents 56 from the spare space 150. Accordingly, the series 130 of small disk extents 56 may grow as a contiguous sequence of small disk extents 56 in the direction 170 by consuming some of the spare space 150.

Also, the storage processing circuitry 40 may reduce the series 130 of small disk extents 56 by reclaiming used small disk extents 56 and returning them to the spare space 150 (e.g., via the garbage collection service). Accordingly, the series 130 of small disk extents 56 may shrink in a direction which is opposite the arrow 170. Further details will now be provided with reference to FIGS. 4 and 5.

Figure 4:
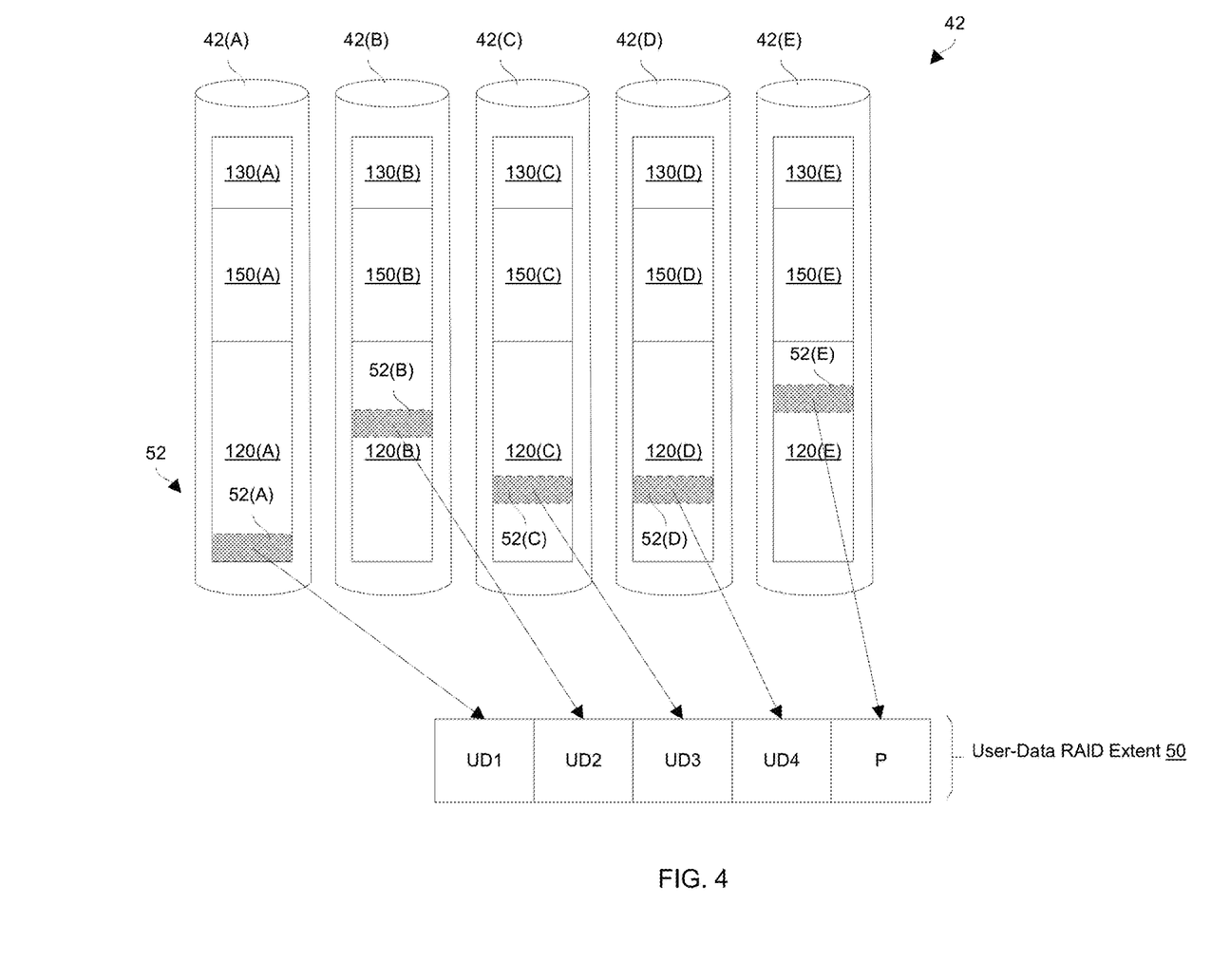
FIG. 4 is a block diagram illustrating an example user-data RAID extent in accordance with certain embodiments.
Figure 5:
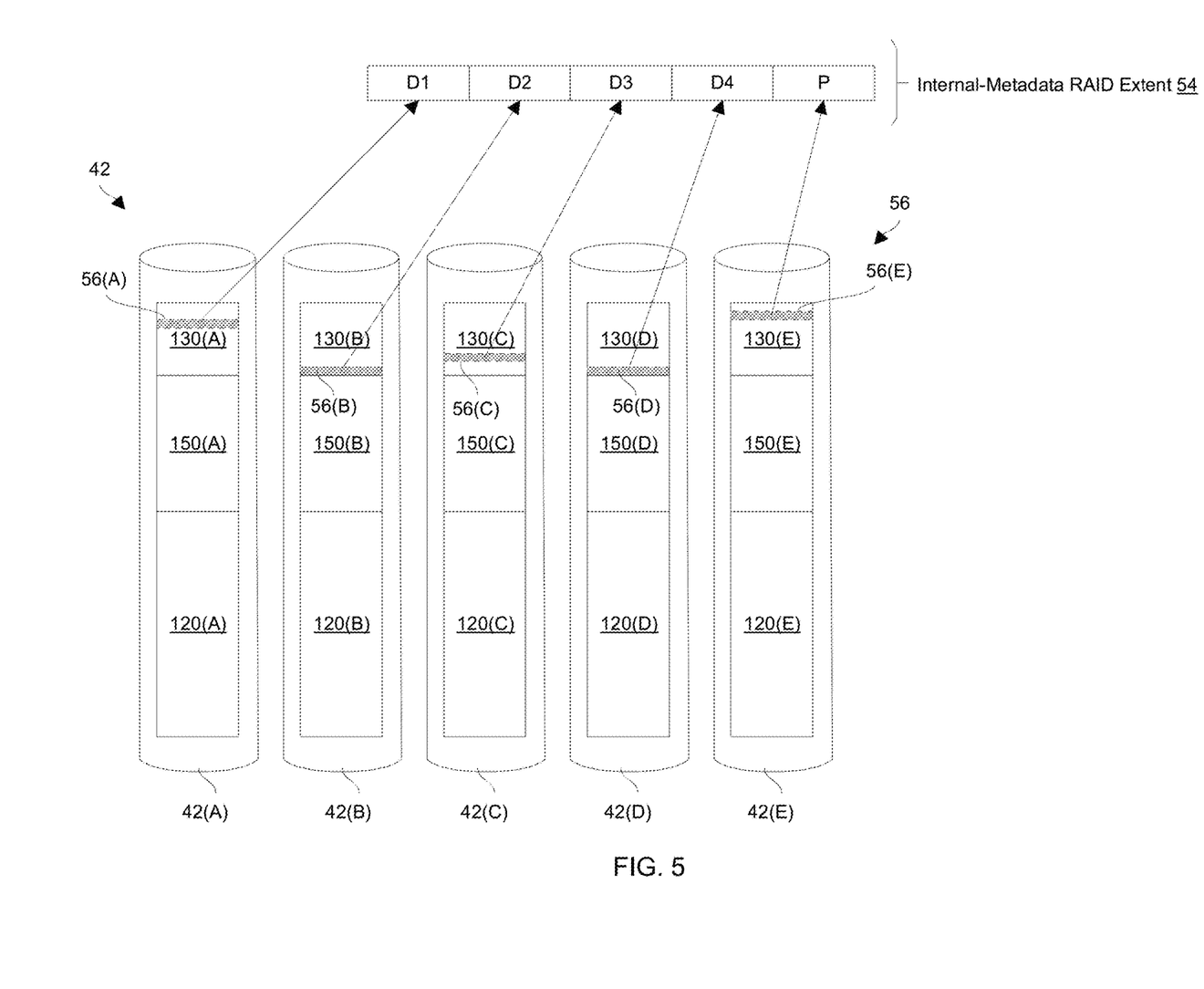
FIG. 5 is a block diagram illustrating an example internal-metadata RAID extent in accordance with certain embodiments.

FIGS. 4 and 5 show particular details regarding how RAID extents 50, 54 are formed from disk extents 52, 56. FIG. 4 shows a set of storage devices 42 that provides large disk extents 52 to form a user-data RAID extent 50. FIG. 5 shows a set of storage devices 42 that provides small disk extents 56 to form an internal-metadata RAID extent 54.

In particular, FIG. 4 shows an example user-data RAID extent 50 in accordance with certain embodiments. The example user-data RAID extent 50 is formed from large disk extents 52 on different storage devices 42(A), 42(B), 42(C), 42(D), and 42(E). It should be understood that these storage devices 42 may also provide small disk extents 56 that form internal-metadata RAID extents 54 (also see FIG. 5).

As shown in FIG. 4, the example user-data RAID extent 50 includes a large disk extent 52(A) residing within the series 120(A) of large disk extents on the storage device 42(A), a large disk extent 52(B) residing within the series 120(B) of large disk extents on the storage device 42(B), a large disk extent 52(C) residing within the series 120(C) of large disk extents on the storage device 42(C), a large disk extent 52(D) residing within the series 120(D) of large disk extents on the storage device 42(D), and a large disk extent 52(E) residing within the series 120(E) of large disk extents on the storage device 42(E). As shown in FIG. 4, the large disk extents 52 that form the example user-data RAID extent 50 may be taken from different LBAs of the storage devices 42.

As further shown in FIG. 4, the example user-data RAID extent 50 stores user data in accordance with RAID Level 5. Along these lines, the example user-data RAID extent 50 includes a user data segment (UD1) which resides in the large disk extent 52(A) on the storage device 42(A), a user data segment (UD2) which resides in the large disk extent 52(B) on the storage device 42(B), a user data segment (UD3) which resides in the large disk extent 52(C) on the storage device 42(C), a user data segment (UD4) which resides in the large disk extent 52(D) on the storage device 42(D), and a parity segment (P) which resides in the large disk extent 52(E) on the storage device 42(E).

The user-data RAID extent 50 provides fault tolerance under RAID Level 5 by way of example. In particular, if one of the user data segments or the parity segment is corrupted or lost, the lost segment may be reconstructed from the other segments (e.g., via XOR operations).

Other user-data RAID extents 50 may be formed from the same storage devices 42 and/or other storage devices 42 in accordance with a mapped-RAID architecture. Ideally, the I/Os for accessing the user data are evenly (e.g., randomly) distributed among the storage devices 42 of the data storage equipment 24 (FIG. 1) to maximize parallelization, minimize access times, minimize contention, and so on. Further details will now be provided with reference to FIG. 5.

FIG. 5 shows an example internal-metadata RAID extents 54 in accordance with certain embodiments. The example internal-metadata RAID extents 54 is formed from small disk extents 56 on different storage devices 42(A), 42(B), 42(C), 42(D), and 42(E). It should be understood that these storage devices 42 may also provide large disk extents 52 that form user-data RAID extents 50 (also see FIG. 4).

The example internal-metadata RAID extent 54 includes a small disk extent 56(A) residing within the series 130(A) of small disk extents on the storage device 42(A), a small disk extent 56(B) residing within the series 130(B) of small disk extents on the storage device 42(B), a small disk extent 56(C) residing within the series 130(C) of small disk extents on the storage device 42(C), a small disk extent 56(D) residing within the series 130(D) of small disk extents on the storage device 42(D), and a small disk extent 56(E) residing within the series 130(E) of small disk extents on the storage device 42(E). As shown in FIG. 5, the small disk extents 56 that form the example user-data RAID extent 50 may be taken from different LBAs of the storage devices 42.

As further shown in FIG. 5, the example internal-metadata RAID extent 54 stores internal metadata in accordance with RAID Level 5. Along these lines, the example internal-metadata RAID extent 54 includes an internal metadata segment (MD1) which resides in the small disk extent 56(A) on the storage device 42(A), an internal metadata segment (MD2) which resides in the small disk extent 56(B) on the storage device 42(B), an internal metadata segment (MD3) which resides in the small disk extent 56(C) on the storage device 42(C), an internal metadata segment (MD4) which resides in the small disk extent 56(D) on the storage device 42(D), and a parity segment (P) which resides in the small disk extent 56(E) on the storage device 42(E).

The internal-metadata RAID extent 50 provides fault tolerance under RAID Level 5 by way of example. In particular, if one of the internal metadata segments or the parity segment is corrupted or lost, the lost segment may be reconstructed from the other segments (e.g., via XOR operations).

Other internal-metadata RAID extents 54 may be formed from the same storage devices 42 and/or other storage devices 42 in accordance with a mapped-RAID architecture. Ideally, the I/Os for accessing the internal metadata are evenly (e.g., randomly) distributed among the storage devices 42 to maximize parallelization, minimize access times, minimize contention, and so on. Further details will now be provided with reference to FIG. 6.

Figure 6:
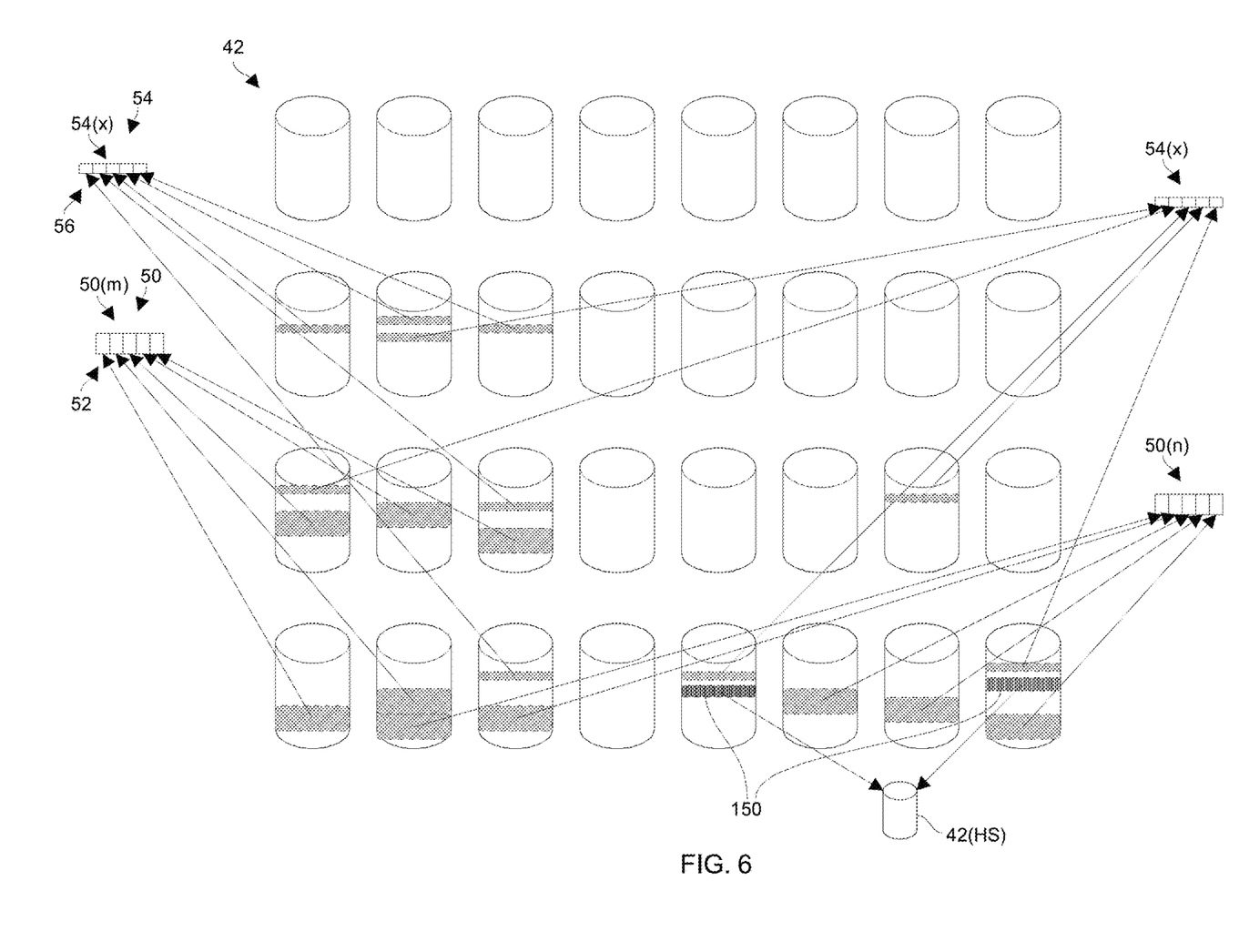
FIG. 6 is a block diagram illustrating an example mapped-RAID implementation in accordance with certain embodiments.

FIG. 6 shows an example mapped-RAID implementation in accordance with certain embodiments. The example mapped-RAID implementation includes 32 storage devices 42 by way of example only. Other numbers of storage devices 42 are suitable for use as well (e.g., 16, 64, over 100, etc.).

As shown in FIG. 6, the various large disk extents 52 that form the user-data RAID extents 50 such as user-data RAID extents 50(m), 50(n) are randomly distributed among the storage devices 42 for I/O parallelization. Similarly, the various small disk extents 56 that form the internal-metadata RAID extents 54 such as internal-metadata RAID extents 54(x), 54(y) are randomly distributed among the storage devices 42 for I/O parallelization.

As shown in simplified form in FIG. 6, the same storage device 42 may provide multiple large disk extents 52 and/or multiple small disk extents 56. In some arrangements, it is common for at least some if not all of the storage device 42 to include multiple large disk extents 52 as well as multiple small disk extents 56 (also see FIG. 3). As further shown in FIG. 6, at least some of the storage devices 42 contribute spare space 150 (i.e., storage space which remains on a storage device 42 between the large disk extents 52 and the small disk extents 56) to a hot spare storage device 42(HS) which is used for data reconstruction purposes and/or to store data that resided on a failed storage device 42.

It should be understood that the data within the various large disk extents 52 and/or small disk extents 56 may move (or migrate) over time. For example, a garbage collecting service may consolidate blocks of multiple large disk extents 52 into a single large disk extent 52 in order to return (or free) the storage space consumed on one or more large disk extents 52 back to spare space 150. Likewise, the garbage collecting service may consolidate blocks of multiple small disk extents 56 into a single small disk extent 56 in order to return (or free) the storage space consumed on one or more small disk extents 56 back to spare space 150.

With such further spare space 150 now reclaimed and available, such spare space 150 may be repurposed. For example, storage space of the spare space 150 that was earlier used for a large disk extent 52 may now be used for a small disk extent 56. Similarly, storage space of the spare space 150 that was earlier used for a small disk extent 56 may now be used for a large disk extent 52. It should be understood that such repurposing of storage space of the spare space 150 may result from a change in access behavior, e.g., a ratio of user data to metadata change in an I/O profile of the data storage equipment 24. Further details will now be provided with reference to FIGS. 7 and 8.

Figure 7:
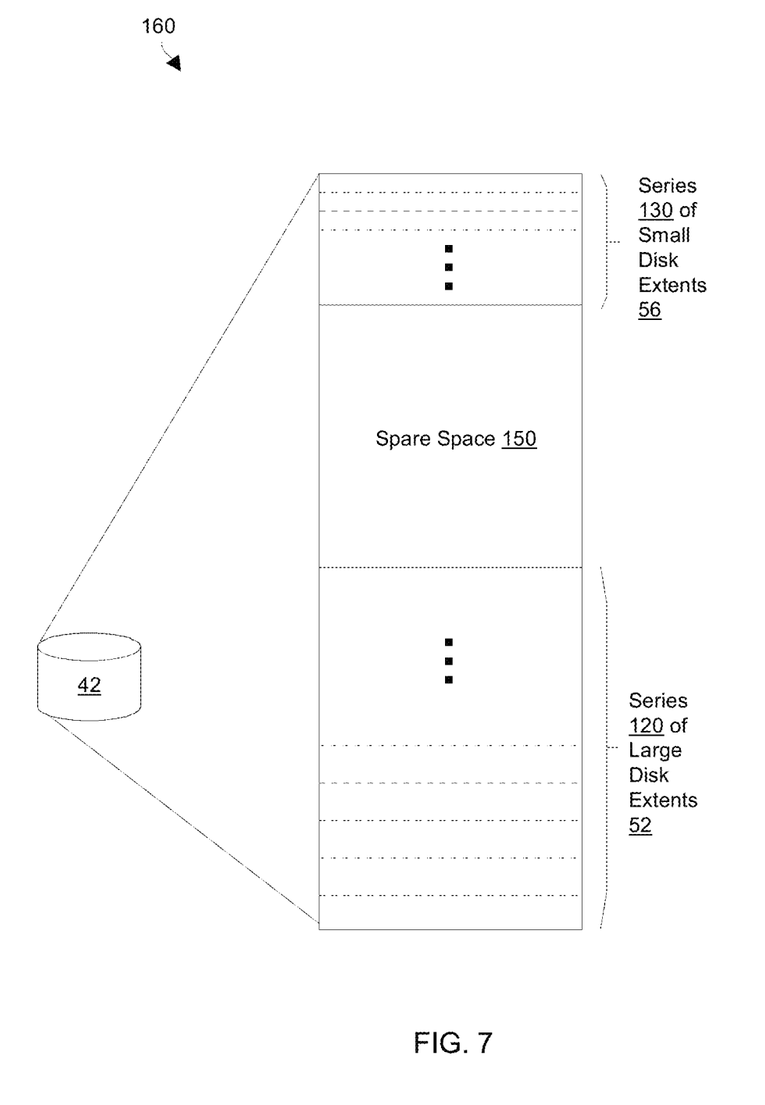
FIG. 7 is a block diagram illustrating a first configuration of large disk extents and small disk extents on an example storage device in accordance with certain embodiments.
Figure 8:
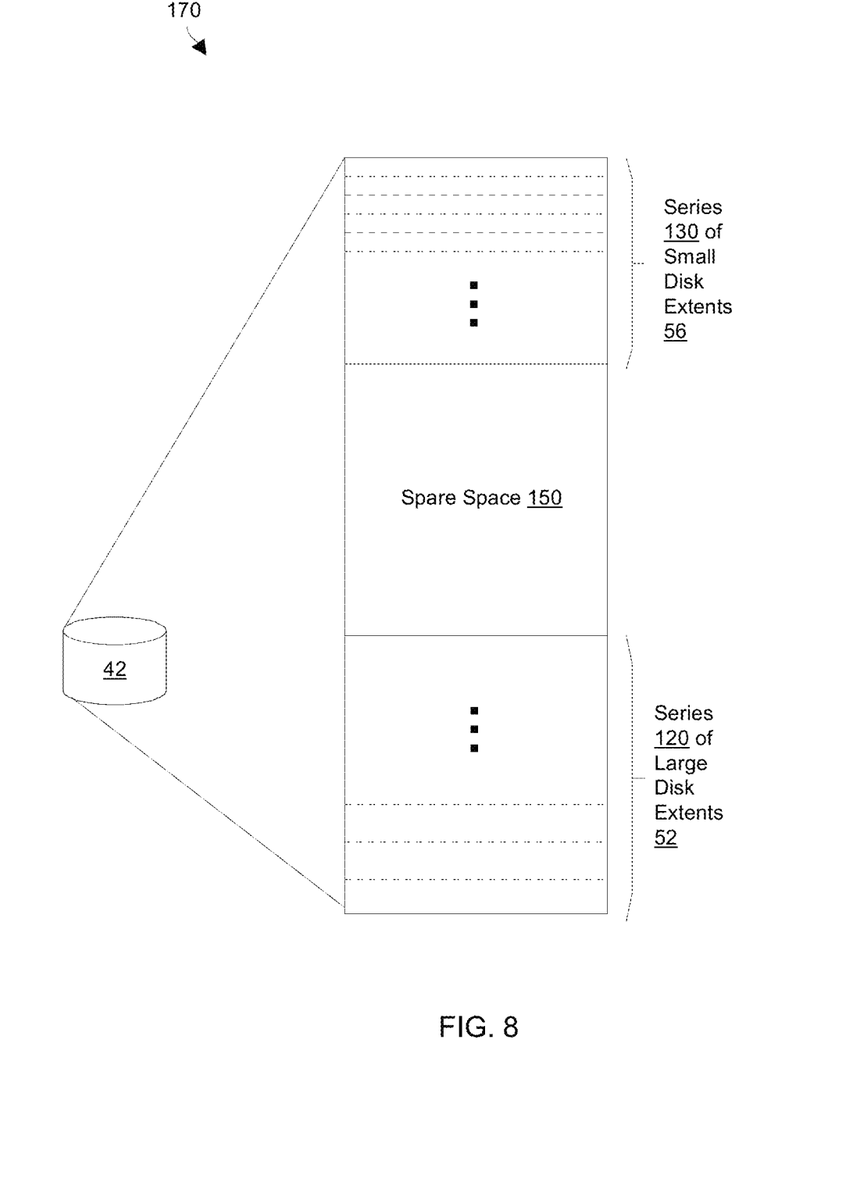
FIG. 8 is a block diagram illustrating a second configuration of large disk extents and small disk extents on the example storage device in accordance with certain embodiments.

FIGS. 7 and 8 show details of how the arrangement of large disk extents 52 and small disk extents 56 may change on a storage device 42, e.g., in response to a change in operating behavior. FIG. 7 shows a first configuration 160 of large disk extents 52 and small disk extents 56 on an example storage device 42 during a first period of operation. FIG. 8 shows a second configuration 170 of large disk extents 52 and small disk extents 56 on the example storage device 42 during a second period of operation after some of the space consumed by large disk extents 52 has been repurposed.

As shown in FIG. 7, the series 120 of large disk extents 52 occupies space at one end of the storage device 42. Additionally, the series 130 of small disk extents 56 occupies space at the opposite end of the storage device 42. Furthermore, spare space 150 resides between the two extent series 120, 130.

For some storage devices 42, a portion of the spare space 150 is reserved for forming at least a portion of a virtual hot spare storage device 42 (FIG. 6) and thus unavailable for use as a portion of the series 120 of large disk extents 52 or a portion of the series 130 of small disk extents 56. However, in accordance with certain embodiments, it is permissible that some storage devices 42 not have spare space 150 reserved thus enabling maximum use of the storage space 150 for disk extents.

It should be understood that the ratio of user data to internal metadata may change as the I/O profile changes. For example, suppose that snapshots are created periodically. Further suppose that, during a first period of time, there is not much change in the user data. Accordingly, during the first period of time, the amount of space occupied by the series 120 of large disk extents 52 and the series 130 of small disk extents 56 may remain relatively stable as shown by the configuration 160 in FIG. 7.

However, suppose that there is significant change in the user data. Along these lines, much of the original user data may be overwritten, a deduplication setting may have been changed, the periodicity for making snapshots may have been changed, and so on. Accordingly, the ratio of user data to internal metadata may change. As a result, the specialized circuitry of the data storage equipment 24 may reclaim some of the consumed space (e.g., via a garbage collection service) and repurpose that space.

FIG. 8 shows a second configuration 170 of large disk extents 52 and small disk extents 56 on the example storage device 42 after storage space on the storage device 42 has been reclaimed and repurposed. Here, by way of example only, some of the large disk extents 52 has been reclaimed and returned to the spare space 150 so the series 120 of large disk extents 52 is now smaller. Additionally, by way of example only, the specialized circuitry has created more small disk extents 56 from the spare space 150 so the series 150 of small disk extents 56 is larger. Along these lines, some of the storage space of the storage device 42 that was earlier consumed by large disk extents 52 may now be consumed by small disk extents 56.

It should be understood that such repurposing may take place even if a predefined amount of the spare space 150 is reserved for a virtual hot spare storage device 42. Along these lines, the particular LBAs that form the spare space 150 may change, but the amount of storage space that is reserved stay the same. Further details will now be provided with reference to FIG. 9.

Figure 9:
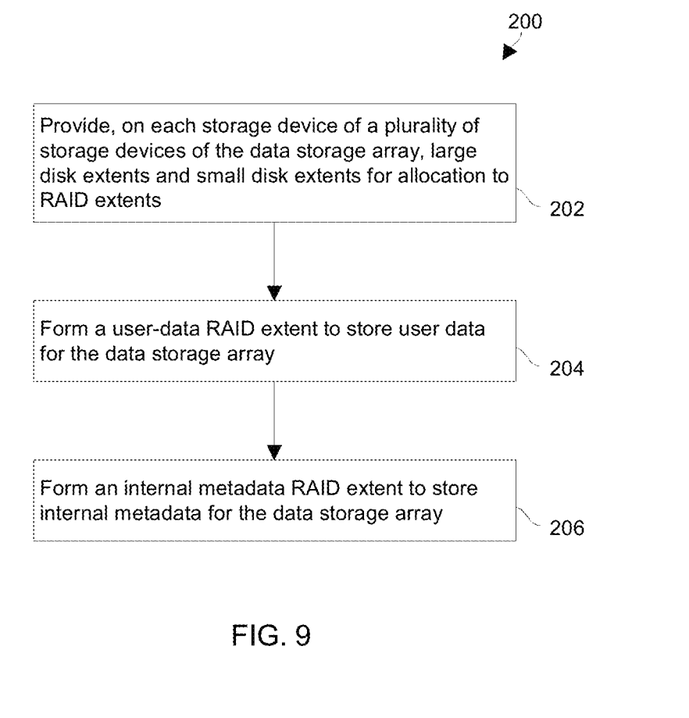
FIG. 9 is a flowchart of a procedure which is performed by the data storage environment of FIG. 1 in accordance with certain embodiments.

FIG. 9 is a flowchart of a procedure 200 which is performed by the data storage environment 20 in accordance with certain embodiments. Such a procedure 200 may be performed by specialized circuitry such as that formed by the processing circuitry 76 operating in accordance with the specialized code and data 84 (also see FIG. 2).

At 202, the specialized circuitry provides, on each storage device of the plurality of storage devices, large disk extents and small disk extents for allocation to RAID extents. In particular, for each storage device, the specialized circuitry slices large disk extents from one end of the LBA range of that storage device and slices small disk extents from the other end of the LBA range of the that storage device.

At 204, the specialized circuitry forms, from the large disk extents, a user-data RAID extent to store user data for the data storage array. Here, the specialized circuitry may form one or more user-data RAID extents on demand.

At 206, the specialized circuitry forms, from the small disk extents, an internal-metadata RAID extent to store internal metadata for the data storage array. Here, the specialized circuitry may form one or more internal-metadata RAID extents on demand.

As described above, improved techniques are directed to providing large disk extents 52 and small disk extents 56 on storage devices 42 for allocation to RAID extents 50, 54 of data storage equipment 24. Along these lines, the large disk extents 52 form user-data RAID extents 50 to store user data. Additionally, the small disk extents 56 form internal-metadata RAID extents 54 to store internal metadata. Accordingly, the user-data RAID extents 50 are larger thus enabling the number of disk extents that need to be tracked to remain small. Furthermore, the internal-metadata RAID extents 54 are smaller thus enabling the internal-metadata RAID extents 54 to span more quickly among the storage devices thus improving I/O parallelization (i.e., simultaneous I/Os for faster access).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In storage systems, data stored on the storage drives is not only user-data but also internal metadata used to describe the location of user-data (e.g., mappings) on the drives. Other internal metadata used to implement features such as snapshots, deduplication, compression, etc are also stored on these drives. Access patterns for user data and internal metadata are different and they have different performance requirements It should be understood that one of the features of storage systems is mapped-RAID, where storage drive capacity is divided into disk extents. These disk extents are the unit of allocation out of which RAID extents are created.

A conventional mapped-RAID implementations of mapped-RAID involves slicing all disk extents into same size to enable ease of selection of disk extents when configuring RAID extents. Also, these disk extents are relatively large so that number of disk extents that need to tracked is small. However, this conventional approach creates a problem because, RAID extents created for internal metadata are too big. All the internal metadata can get concentrated in few RAID extents and limited to only the storage drives participating in those RAID extents. Nevertheless, fast access to metadata is extremely important for the performance of the system and so not being able to take advantage of all the storage drives is a problem.

Mapped-RAID consumes storage drives by partitioning them into disk extents. RAID extents are created using one or more disk extents from different storage drives.

To solve the problem of metadata concentration because of large disk extents and thereby RAID extents and in accordance with certain embodiments, techniques involve creating disk extents of two different sizes on the same storage devices. Smaller disk extents are created starting from one-end (e.g. start LBA) of the storage devices and larger disk extents are created starting from other end of the storage devices. The unused storage space in the middle can be consumed as disk extents of either extent-size and also used as a distributed "hot-spare" storage device.

Smaller disk extents are used for internal-metadata which constitutes a small percentage of the system storage. Larger disk extents are used for user data, which constitutes a large percentage of the storage system. Smaller disk extent size allows metadata RAID extents to span more quickly among all the storage devices in the system, improving IO parallelization. Larger disk extent size for user data RAID extents reduces overhead for tracking extents, without sacrificing IO parallelization.

When ratio for user data-to-internal metadata changes as the I/O profile changes and more metadata needs to be created, RAID identifies the larger user-data disk extents adjacent to the "hot spare" so that they can be garbage-collected, unmapped and repurposed as smaller metadata disk extents. This dynamic repurposing of disk extents between user-data extents and metadata extents solves the problem of unusable storage capacity because of running out of one type of disk extents but not the other type.

When a drive fails, the "hot-spare" is used to configure either user-data extents or metadata extents to fix user-data extents and/or metadata extents of the failed drive.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In accordance with certain embodiments, the specialized circuitry maintains a distinction between relatively larger user-data RAID extents 50 that are dedicating to storing user data (e.g., any higher level data such as host data) and relatively smaller internal metadata RAID extents 54 that are dedicating to storing internal metadata (e.g., any lower level data that the specialized circuitry uses to support its operation such as mapping tables, pointers, deduplication digests, and so on). Such modifications and enhancements are intended to belong to various embodiments of the disclosure.

What is claimed is:

1. A method of storing data on a plurality of storage devices of a data storage array, the method comprising:
   on each storage device of the plurality of storage devices, providing large disk extents and small disk extents for allocation to Redundant Array of Independent Disk (RAID) extents;
   from the large disk extents, forming a user-data RAID extent to store user data for the data storage array; and
   from the small disk extents, forming an internal-metadata RAID extent to store internal metadata for the data storage array;
   wherein each storage device of the plurality of storage devices has a first end and a second end that define a logical block address (LBA) range, a lowest LBA of the LBA range starting at one of the first end and the second end of that storage device, and a highest LBA of the LBA range starting at the other of the first end and the second end of that storage device; and
   wherein providing the large disk extents and the small disk extents for allocation to the RAID extents includes:
   on each storage device of the plurality of storage devices, creating a series of large disk extents starting at the first end of that storage device and creating a series of small disk extents starting at the second end of that storage device.

2. A method as in claim 1 wherein creating the series of large disk extents on each storage device of the plurality of storage devices includes slicing storage space starting at the first end of that storage device into a contiguous sequence of large disk extents, each large disk extent having a same large disk extent size; and
   wherein creating the series of small disk extents on each storage device of the plurality of storage devices includes slicing storage space starting at the second end of that storage device into a contiguous sequence of small disk extents, each small disk extent having a same small disk extent size which is smaller than the large disk extent size.

3. A method as in claim 2, further comprising:
   on at least some storage devices of the plurality of storage devices, reserving spare space between the contiguous sequence of large disk extents and the contiguous sequence of small disk extents created on those storage devices while the user-data RAID extent stores user data for the data storage array and the internal-metadata RAID extent stores internal metadata for the data storage array.

4. A method as in claim 3, further comprising:
   in response to a request to form another user-data RAID extent, allocating a portion of spare space on a particular storage device to extend a contiguous sequence of large disk extents starting at the first end of the particular storage device.

5. A method as in claim 3, further comprising:
   in response to a request to form another internal-metadata RAID extent, allocating a portion of spare space on a particular storage device to extend a contiguous sequence of small disk extents starting at the second end of the particular storage device.

6. A method as in claim 3, further comprising:
in response to a request to form another user-data RAID extent, allocating a first portion of spare space on a particular storage device to extend a contiguous sequence of large disk extents starting at the first end of the particular storage device, and
in response to a request to form another internal-metadata RAID extent, allocating a second portion of spare space on a particular storage device to extend a contiguous sequence of small disk extents starting at the second end of the particular storage device.

7. A method as in claim 6 wherein the first portion of spare space on the particular storage device is allocated from a first end of the spare space closest to the first end of the particular storage device to extend the contiguous sequence of large disk extents, and
wherein the second portion of spare space on the particular storage device is allocated from a second end of the spare space closest to the second end of the particular storage device to extend the contiguous sequence of large disk extents.

8. A method as in claim 3, further comprising:
in response to a change in an input/output (I/O) profile of the data storage array, performing a garbage collection operation to reclaim at least one large disk extent of a contiguous sequence of large disk extents on a particular storage device, the at least one large disk extent being returned to a spare space between the contiguous sequence of large disk extents and a contiguous sequence of small disk extents on the particular storage device.

9. A method as in claim 8 wherein the at least one large disk extent included a particular large disk extent that consumed storage space on the particular storage device; and
wherein the method further comprises:
repurposing the storage space consumed by the particular large disk extent into at least one small disk extent for use in a new internal-metadata RAID extent.

10. A method as in claim 3, further comprising:
in response to a ratio change in an input/output (I/O) profile of the data storage array, performing a garbage collection operation to reclaim at least one small disk extent of a contiguous sequence of small disk extents on a particular storage device, the at least one small disk extent being returned to a spare space between a contiguous sequence of large disk extents and the contiguous sequence of small disk extents on the particular storage device.

11. A method as in claim 10 wherein the at least one small disk extent included a particular small disk extent that consumed storage space on the particular storage device; and
wherein the method further comprises:
repurposing the storage space consumed by the particular small disk extent into a portion of a large disk extent for use in a new user-data RAID extent.

12. A method as in claim 3, further comprising:
allocating the spare space from a set of storage devices to form a hot-spare storage device for use by the data storage array to reconstruct data from a failed storage device.

13. A method as in claim 12, further comprising:
reconstructing data from the failed storage device using the hot-spare storage device while the plurality of storage devices store, as the user data, host data on behalf of a set of host computer in accordance with a mapped-RAID architecture.

14. A method as in claim 2 wherein forming the user-data RAID extent to store the user data for the data storage array includes combining multiple large disk extents into a first storage object that provides data storage resiliency in accordance with a particular RAID level, each of the multiple large disk extents residing on a different storage device, the data storage array storing user data within the first storage object on behalf of a set of host computers; and
wherein forming the internal-metadata RAID extent to store the internal metadata for the data storage array includes combining multiple small disk extents into a second storage object that provides data storage resiliency in accordance with the particular RAID level, each of the multiple small disk extents residing on a different storage device, the data storage array storing internal metadata within the second storage object in support of storing user data on behalf of the set of host computers.

15. Data storage equipment, comprising:
memory; and
control circuitry coupled to the memory, the memory storing instructions which, when carried out by the control circuitry, cause the control circuitry to:
on each storage device of a plurality of storage devices, provide large disk extents and small disk extents for allocation to Redundant Array of Independent Disk (RAID) extents;
from the large disk extents, form a user-data RAID extent to store user data for the data storage array; and
from the small disk extents, form an internal-metadata RAID extent to store internal metadata for the data storage array;
wherein each storage device of the plurality of storage devices has a first end and a second end that define a logical block address (LBA) range, a lowest LBA of the LBA range starting at one of the first end and the second end of that storage device, and a highest LBA of the LBA range starting at the other of the first end and the second end of that storage device; and
wherein the control circuitry, when providing the large disk extents and the small disk extents for allocation to the RAID extents, is constructed and arranged to:
on each storage device of the plurality of storage devices, creating a series of large disk extents starting at the first end of that storage device and creating a series of small disk extents starting at the second end of that storage device.

16. Data storage equipment as in claim 15 wherein the control circuitry, when creating the series of large disk extents on each storage device of the plurality of storage devices is constructed and arranged to slice storage space starting at the first end of that storage device into a contiguous sequence of large disk extents, each large disk extent having a same large disk extent size; and
wherein the control circuitry, when creating the series of small disk extents on each storage device of the plurality of storage devices, is constructed and arranged to slice storage space starting at the second end of that storage device into a contiguous sequence of small disk extents, each small disk extent having a same small disk extent size which is smaller than the large disk extent size.

17. Data storage equipment as in claim 16 wherein the control circuitry is further constructed and arranged to:

on at least some storage devices of the plurality of storage devices, reserve spare space between the contiguous sequence of large disk extents and the contiguous sequence of small disk extents created on those storage devices while the user-data RAID extent stores user data for the data storage array and the internal-metadata RAID extent stores internal metadata for the data storage array.

18. A computer program product having a non-transitory computer readable medium which stores a set of instructions to store data on a plurality of storage devices of a data storage array; the set of instructions, when carried out by computerized circuitry, causing the computerized circuitry to perform a method of:
  on each storage device of the plurality of storage devices, providing large disk extents and small disk extents for allocation to Redundant Array of Independent Disk (RAID) extents;
  from the large disk extents, forming a user-data RAID extent to store user data for the data storage array; and
  from the small disk extents, forming an internal-metadata RAID extent to store internal metadata for the data storage array, the user-data RAID extent being larger in size than the internal-metadata RAID extent;
  wherein each storage device of the plurality of storage devices has a first end and a second end that define a logical block address (LBA) range, a lowest LBA of the LBA range starting at one of the first end and the second end of that storage device, and a highest LBA of the LBA range starting at the other of the first end and the second end of that storage device; and
  wherein providing the large disk extents and the small disk extents for allocation to the RAID extents includes:
  on each storage device of the plurality of storage devices, creating a series of large disk extents starting at the first end of that storage device and creating a series of small disk extents starting at the second end of that storage device.

19. A computer program product as in claim 16 wherein creating the series of large disk extents on each storage device of the plurality of storage devices includes slicing storage space starting at the first end of that storage device into a contiguous sequence of large disk extents, each large disk extent having a same large disk extent size; and
  wherein creating the series of small disk extents on each storage device of the plurality of storage devices includes slicing storage space starting at the second end of that storage device into a contiguous sequence of small disk extents, each small disk extent having a same small disk extent size which is smaller than the large disk extent size.

20. A computer program product as in claim 19 wherein the method further includes:
  on at least some storage devices of the plurality of storage devices, reserving spare space between the contiguous sequence of large disk extents and the contiguous sequence of small disk extents created on those storage devices while the user-data RAID extent stores user data for the data storage array and the internal-metadata RAID extent stores internal metadata for the data storage array.

\* \* \* \* \*